(12) United States Patent
Noha et al.

(10) Patent No.: US 7,779,194 B2
(45) Date of Patent: Aug. 17, 2010

(54) DATA MODIFICATION MODULE

(75) Inventors: Frank Noha, Sugarland, TX (US);
Bernhard Fuessl, Moosburg/Aich (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/144,739

(22) Filed: Jun. 24, 2008

(65) Prior Publication Data

US 2009/0070502 A1 Mar. 12, 2009

Related U.S. Application Data

(60) Provisional application No. 61/016,715, filed on Dec. 26, 2007.

(30) Foreign Application Priority Data

Jun. 28, 2007 (DE) .................. 10 2007 029 833

(51) Int. Cl.
*G06F 13/00* (2006.01)
(52) U.S. Cl. .................. 710/308; 710/22; 710/26; 710/316
(58) Field of Classification Search .......... 710/22, 710/308, 316, 317, 26
See application file for complete search history.

(56) References Cited

U.S. PATENT DOCUMENTS

| | | | | |
|---|---|---|---|---|
| 5,506,973 A | * | 4/1996 | Okazawa et al. | 710/305 |
| 5,970,251 A | | 10/1999 | Zimmermann et al. | |
| 7,120,708 B2 | * | 10/2006 | Futral et al. | 710/26 |
| 7,200,692 B2 | * | 4/2007 | Singla et al. | 710/22 |
| 7,433,977 B2 | * | 10/2008 | Barrow et al. | 710/22 |
| 2007/0294583 A1 | | 12/2007 | Traskov et al. | |
| 2008/0126662 A1 | * | 5/2008 | Rajbharti | 710/308 |
| 2009/0024776 A1 | * | 1/2009 | Cheung et al. | 710/110 |

FOREIGN PATENT DOCUMENTS

| | | |
|---|---|---|
| DE | 195 00 453 A1 | 1/1995 |
| DE | 102 37 173 A1 | 2/2004 |
| WO | WO 2005/078586 A2 | 8/2005 |

OTHER PUBLICATIONS

Arasan Chip Systems, Inc.; *High Speed SPI—AHB IP Core*; INET (online) 2006, XP002494899; Cited in Foreign Search Report.

(Continued)

*Primary Examiner*—Glenn A Auve
(74) *Attorney, Agent, or Firm*—Robert D. Marshall, Jr.; W. James Brady; Frederick J. Telecky, Jr.

(57) ABSTRACT

The present invention relates to a microcontroller including a central processing unit, at least one memory, a bus coupling the storage location to the central processing unit, and a data modification module for modifying data in the at least one memory. The data modification module includes a first interface being coupled to the bus for transferring data to the at least one memory over the bus, and a second interface being adapted to be coupled to an external device for receiving the data, wherein the data modification module is adapted to operate as a bus master and to transfer data received from the external device over the bus to the at least one memory.

9 Claims, 4 Drawing Sheets

OTHER PUBLICATIONS

Furber, S.; *ARM System-On-Chip Architecture*; pp. 207-223; Cited in Foreign Search Report.

Texas Instruments; TMS470R1x *Multi-Buffer Serial Peripheral Interface (MibSPI) Reference Guide* (Lit. No. SPNU217B) (online) Oct. 2003, XP007902741; pp. 2, 9, 20, 29; Cited in Foreign Search Report.

Blumrich, M.A., et al.; *Virtual Memory Mapped Network Interface for the Shrimp Multicomputer*; Proc. of the Annual Int'l Symp. on Computer Architecture; Chicago, Apr. 18-21, 1994; IEEE Comp. Soc. Press, US, vol. SYMP. 21, Apr. 18, 1994; pp. 142-153; Cited in Foreign Search Report.

\* cited by examiner

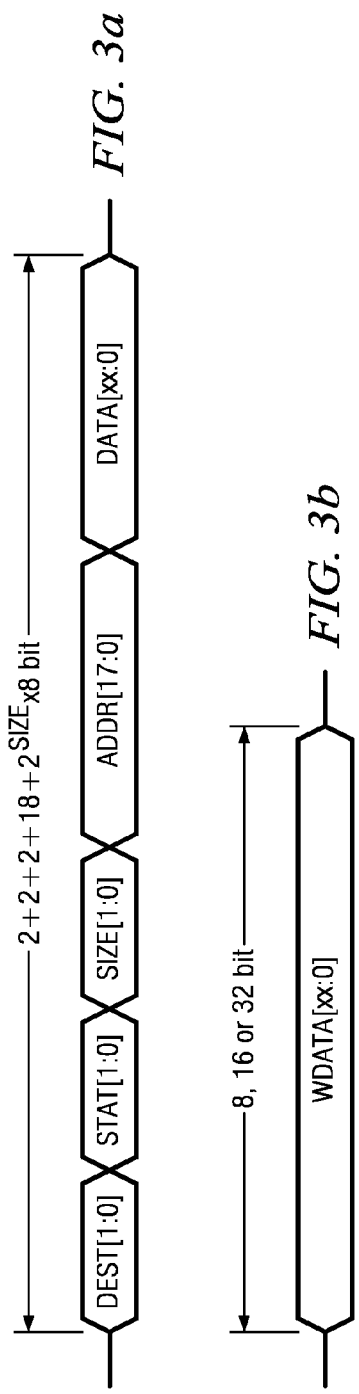
FIG. 3a
FIG. 3b
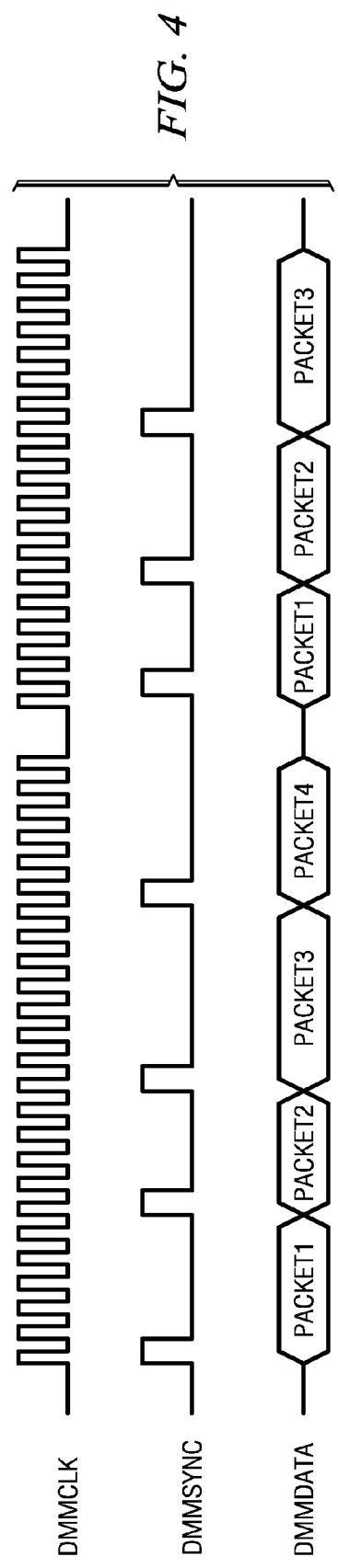
FIG. 4

DATA MODIFICATION MODULE

CLAIM OF PRIORITY

This application claims priority under 35 U.S.C. 119(a) to German Patent Application No. 10 2007 029 833.3 filed Jun. 28, 2007 and 35 U.S.C. 119(e)(1) to U.S. Provisional Application No. 61/016,715 filed Dec. 26, 2007.

TECHNICAL FIELD OF THE INVENTION

The technical field of this invention is a microcontroller including a central processing unit and a memory coupled to a bus.

BACKGROUND OF THE INVENTION

In microcontroller-based applications including internal memory (e.g. RAM) and peripheral interfaces, it is often required to modify the data stored in internal memories and registers (e.g. registers for interfaces to peripherals) by an external device. Known solutions use internal resources, like the internal central processing unit (CPU) or direct memory access (DMA) to perform this data modification. This suspends the normal internal operation of the microcontroller until the external access is accomplished, thereby slowing normal operation.

SUMMARY OF THE INVENTION

It is an object of the present invention to provide a microcontroller allowing effective modification of internal data by an external system without using CPU or DMA resources.

Accordingly, the microcontroller includes a central processing unit, a storage location, a bus coupling the storage location to the central processing unit and a data modification module for modifying data in the storage location. The data modification module includes a first interface coupled to the bus for transferring data to the storage location over the bus, a second interface to be coupled to an external device for receiving the data. The data modification module is further adapted to transfer data as a bus master over the bus. The data is received from the external device at the second interface and transferred via the bus to the storage location. Thus the present invention is a microcontroller with a data modification module that allows effective modification of data internally stored in the microcontroller. Because the data modification module operates as a bus master, no interaction of the CPU or the DMA is necessary. Thus valuable resources of the CPU and the DMA are saved. The write operation is only minimally intrusive upon the program flow because access by the CPU/DMA will only be blocked if the data modification module and the CPU/DMA try to access the same resources. The microcontroller of this invention advantageously includes a dedicated port to the storage location for the data transfer, thereby freeing up the standard microcontroller bus for other transactions.

The data modification module preferably includes a second data buffer to cache the data received via the second interface and a first data buffer to cache the data at the first interface before the data is transmitted to the storage device. This allows a specific amount of data to be received via the second interface from the external device before the data must be transferred to the first interface for transmission over the bus. If the data can not be transmitted over the bus due to a lower priority of the data modification module, the data must be buffered before transferring it to the bus. The number and size of the needed buffers depends on the specific configuration of the microcontroller and the data modification module. According to an aspect of the invention, the data modification module generates an interrupt in response to a buffer full condition. Accordingly, it is possible to signal to the external device and the CPU that a specific amount of data has been received. The start address and length of the buffer can be programmed in the data modification module.

According to the present invention, the data modification module operates in accordance with a specific protocol including at least two modes. In a trace mode, the data modification module receives the destination address for the data in a data packet received from the external device. The data can be written directly to the destination address. A base address can be programmed in a destination register in the data modification module and the received address can be combined with the base address. So, specific storage locations not necessarily contiguous can be written to with no required overhead. In a direct data mode, the data modification module writes data into a buffer which could be a contiguous part of RAM. The module determines the destination address such as the start address, size and destination of the received data using address information internally programmed into the data modification module. The internal address information can be programmed or derived from other information. In the direct data mode, no address information is included in the received data. Accordingly, an extremely high throughput of data can be achieved. Once a packet is received, the data modification module writes it to the first location in the buffer. The following packets are written to subsequent locations in the buffer. Finally, when the last location in the buffer is filled, a flag is set to signal this condition and the address pointer wraps around and writes again to the first location.

According to another aspect of the invention, the second interface includes a pin, which sends an enable signal to the external device. This signals the external device whether or not further data can be received by the data modification module.

The second interface may receive the data at least partially serially. The second interface includes one or more programmable data input pins to receive data. Each input pin receives the data in a serial manner. However, if multiple input pins are present, the data may be distributed over multiple pins. Thus the transmission is a combination of parallel and serial transmission. The second interface may include either 2, 4, 8 or 16 pins for serial data reception on a plurality of parallel transmission lines. The data modification module is further coupled to a bus connecting the CPU to a peripheral device interface. This bus permits transmission of data to the bus and the data storage location. Thus the data storage location may be a location (address) in a peripheral device rather than in an internal memory device.

The data modification module provides a memory protection mechanism in order to avoid overwriting critical data in the storage location. Specific areas of the internal storage locations may be excluded from being overwritten.

The data modification module may be used in combination with a memory trace module for tracing data of a write access to and/or read access from the memory. The memory trace module could be implemented in the same or in a different microcontroller. The memory trace module could include a third interface coupled to an internal bus for capturing the data and a corresponding address information on the bus and a fourth interface coupled to the external device. The memory trace module transfers the captured data and address information from the third to the fourth interface and from the fourth interface to the external device. The combination of both modules provides a very efficient way to trace data in the microcontroller during development of an application and to modify the data if necessary.

If the data modification module and the memory trace module are located in different microcontrollers, the modules can be coupled to each other for inter-processor communication. This inter-processor communication could be between two microcontrollers, but also any other electronic devices with a CPU and internal memory. One device would have the memory trace module and the other device the memory modification module.

The memory trace module preferably uses the same protocol as the data modification module. This allows the external device to efficiently control the data transfer from the memory trace module and the data modification module. Further, the data received from the memory trace module may be transferred directly or transferred after being slightly modified via the data modification module without a need to modify the data format.

The present invention also provides a system including a first electronic device with a central processing unit which operates as a bus master, a storage location, a bus coupling the storage location to the central processing unit and a data modification module for modifying data in the storage location. The data modification module comprises a first interface coupled to the bus to transfer data to the storage location over the bus and a second interface coupled to an external device for receiving the data. The data modification module also operates as a bus master to transfer data received from the external device to the storage location. The data modification module in the first electronic device preferably uses a dedicated port to the storage location to provide more bandwidth on the bus for other transactions. The system also includes a second electronic device with a central processing unit operating as a master device, a storage location, a bus coupling the storage location to the central processing unit and a memory trace module tracing data of a write access to and/or a read access from the memory. The memory trace module has a third interface coupled to the bus for capturing the data and corresponding address information on the bus, a fourth interface coupled to the external device. The memory trace module transfers captured data and address information from the third to the fourth interface and from the fourth interface to the external device.

In the system according to the present invention, the data modification module in the first electronic device and the memory trace module in the second electronic device are preferably adapted in a specific protocol including at least two modes, a trace mode and a direct data mode. In the trace mode, the memory trace module transfers the captured data and address information from the third to the fourth interface and from the fourth interface to the external device. The data modification module receives the destination address for the data in a data packet received from an external device. In the direct data mode, the data modification module determines the destination address for the data using address information internal to the data modification module. The memory trace module retrieves data to be captured directly from a dedicated capture register and transfers the data to the external device. Since neither the trace module nor the data modification module use CPU resources, the present invention provides a very efficient way of inter-processor data communication. For example, the external device such as a computer can receive data from the second electronic device via the memory trace module, log or modify the data if necessary, and send the modified data or any other data to the first electronic device.

According to the present invention, a protocol can be used by the data modification module, the memory trace module and the external devices to communicate with either one or both modules. The protocol is packet oriented. Individual packets for the data destinations, status information, starting address of the data, the size of the data and the data are provided. In the trace mode the data packets include a start address. In the direct data mode the data packets include no overhead.

BRIEF DESCRIPTION OF THE DRAWINGS

These and other aspects of this invention are illustrated in the drawings, in which:

FIG. 3 illustrates waveforms relating to a protocol of this invention;

FIG. 4 illustrates waveforms relating to a synchronization mechanism of this invention;

DETAILED DESCRIPTION OF PREFERRED EMBODIMENTS

Figure 1:
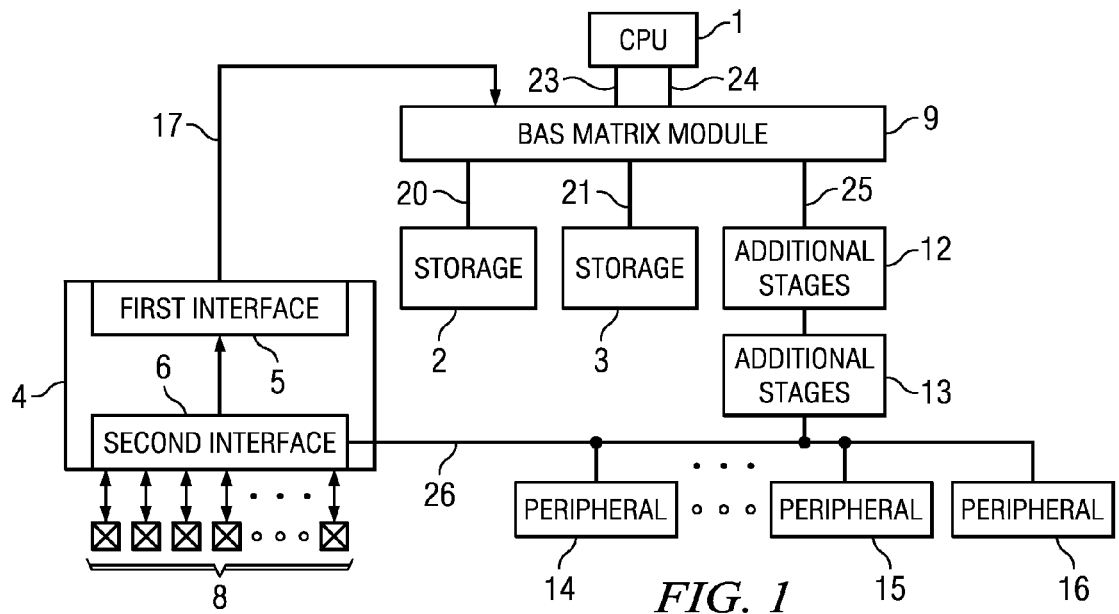
FIG. 1 illustrates a simplified block diagram of a microcontroller of this invention.

FIG. 1 illustrates the simplified basic structure of a microcontroller according to a first embodiment of the invention. CPU 1 which is a bus master, first memory block 2 and second memory block 3 are coupled to each other via busses 23, 24 and 20, 21 and a bus matrix module 9 serving as a traffic router. Data modification module 4 includes a first interface 5 and a second interface 6. Second interface 6 is at least partially serialized having a group of pins to be coupled to an external device which is not shown in FIG. 1. Second interface 6 provides a specific protocol and serializes incoming data. The incoming data is transferred to first interface 5 by which data modification module 4 is coupled to bus structures 17. This bus structure 17 serves to connect data modification module 4 to a bus matrix module 9, thereby providing a dedicated port to storage locations 2 and 3. Additional stages 12 and 13 perform other converting or decoding steps. Data modification module 4 receives data from an external system via a second interface performing a serial to parallel data conversion. Configurable serial/parallel interface 6 is an optimum compromise between low pin count and high data throughput. The protocols used by data modification module 4 are also implemented with respect to a high data throughput. Second interface 6 of data modification module 4 is coupled to peripheral devices 14, 15 and 16 via bus structure 26. Peripheral devices 14, 15 and 16 are also coupled to CPU 1 via bus matrix module 9 and additional protocol transferring stages 12 and 13, and bus structure 25. In order to have optimum access without interfering with normal operation of the CPU of the microcontroller, data modification module 4 is adapted to operate as a bus master.

Figure 2:
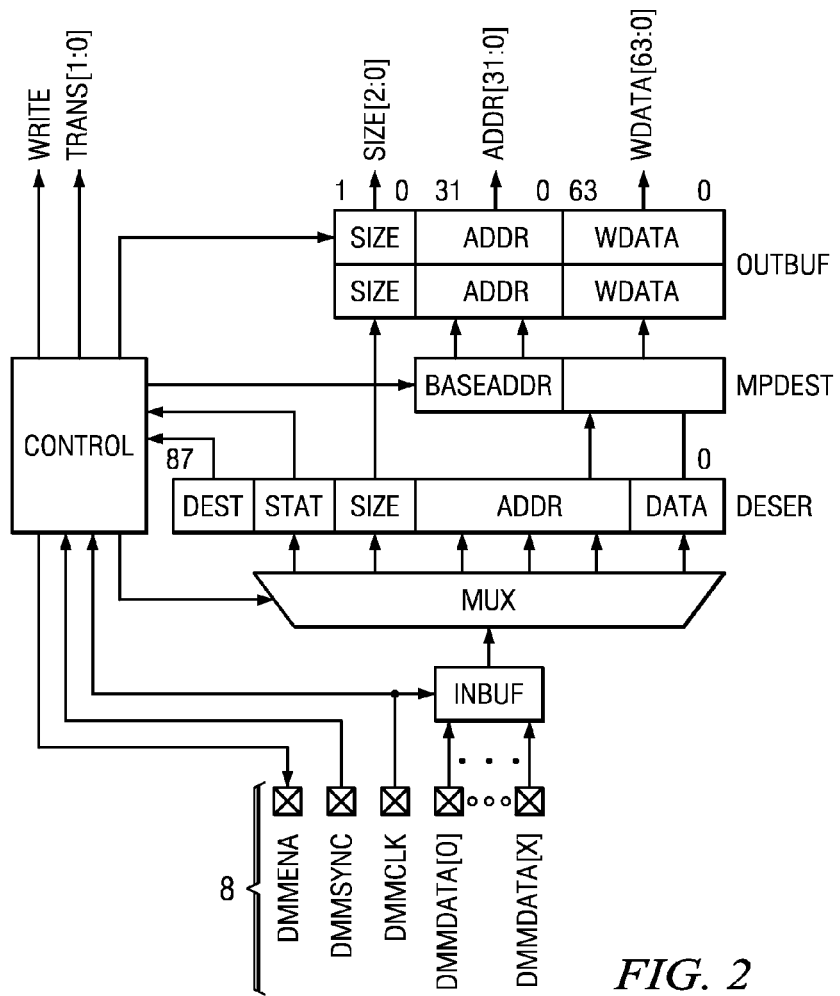
FIG. 2 illustrates a simplified block diagram of a data modification module of this invention.

FIG. 2 shows another simplified block diagram of data modification module 4 in more detail. The input and output pins of the second interface include an enable pin $\overline{DMMENA}$, a synchronization pin DMMSYNC, a clock pin DMMCLK and one or more data input pins DMMDATA[0] . . . DMMDATA[x]. The data received via input pins DMMDATA[0:x] is fed to an input buffer INBUF where it is stored before it is passed to a multiplexer MUX. Multiplexer MUX is coupled to the deserializer DESER including specific fields for the destination DEST, the status information STAT, the size of the data SIZE, the destination address ADDR and the data DATA. Destination and status information are passed to the control block CONTROL. Control block CONTROL receives also the synchronization information DMMSYNC and the clock signal received via input pin DMMCLK. The control block CONTROL produces the enable signal $\overline{\text{DMMENA}}$ in order to signal to an external device that no further data can be received. The address information and the data in the deserializer DESER is passed to the first buffer OUTBUF, from which it is transferred via bus structures WDATA[63:0], ADDR[31:0] and SIZE[2:0] to bus matrix module 9 shown in FIG. 1. WRITE and TRANS[1:0] are further signals produced by control block CONTROL. Memory protection is performed by memory protection destination register MPDEST to avoid overwriting critical storage locations. Control block CONTROL can store a base address BASEADDR in the register MPDEST. Another address received in trace mode via the second interface and stored in deserializer DESER can be compared with the address stored in the register MPDEST to check whether access to a protected destination address is required. If so, the data modification module can issue an interrupt to indicate a forbidden memory access.

FIG. 3 shows two different data configuration protocols including packet formats for data transmission over second interface according to the present invention. FIG. 3(a) shows the packet format in trace mode for storage locations. Each packet consists of: two bits DEST[1:0] denoting the data destination; two status bits STAT[1:0] which are not used by the data modification module but provided to be compatible with a memory trace module; two bits for the size SIZE[1:0]; an 18 bit (256 Kbyte) address of the data ADDR[17:0] and $2^{SIZE} \times 8$ bits of data DATA[xx:0]. The received data can be transferred directly to the destination address. For direct data mode, the data format of a data packet is shown in FIG. 3 (b). Only the data to be written to a specific storage location is included in the data packet consisting of data of a specific length. The packet length is programmable to 8, 16 or 32 bits. The start address and size of a buffer can be programmed into registers in the data modification module. The received data is written to an address pointer based on the information in the registers. The received data can be buffered in a contiguous RAM buffer whose size is only limited by the overall RAM size.

FIG. 4 shows a waveform diagram of signals at the input pins of the second interface as shown in FIG. 2. The external clock signal DMMCLK is asserted by the external device during data transmission. The clock might be configured to be suspended or free-running when a packet data transmission is finished. The memory modification module receives a synchronization signal DMMSYNC in order to signal the beginning of a data packet on data input pins DMMDATA[0:xx]. DMMSYNC is high for one DMMCLK clock cycle in order to synchronize external hardware to the data stream of each packet. Data may be transmitted over a single pin, 2, 4, 8 or more pins.

Figure 5:
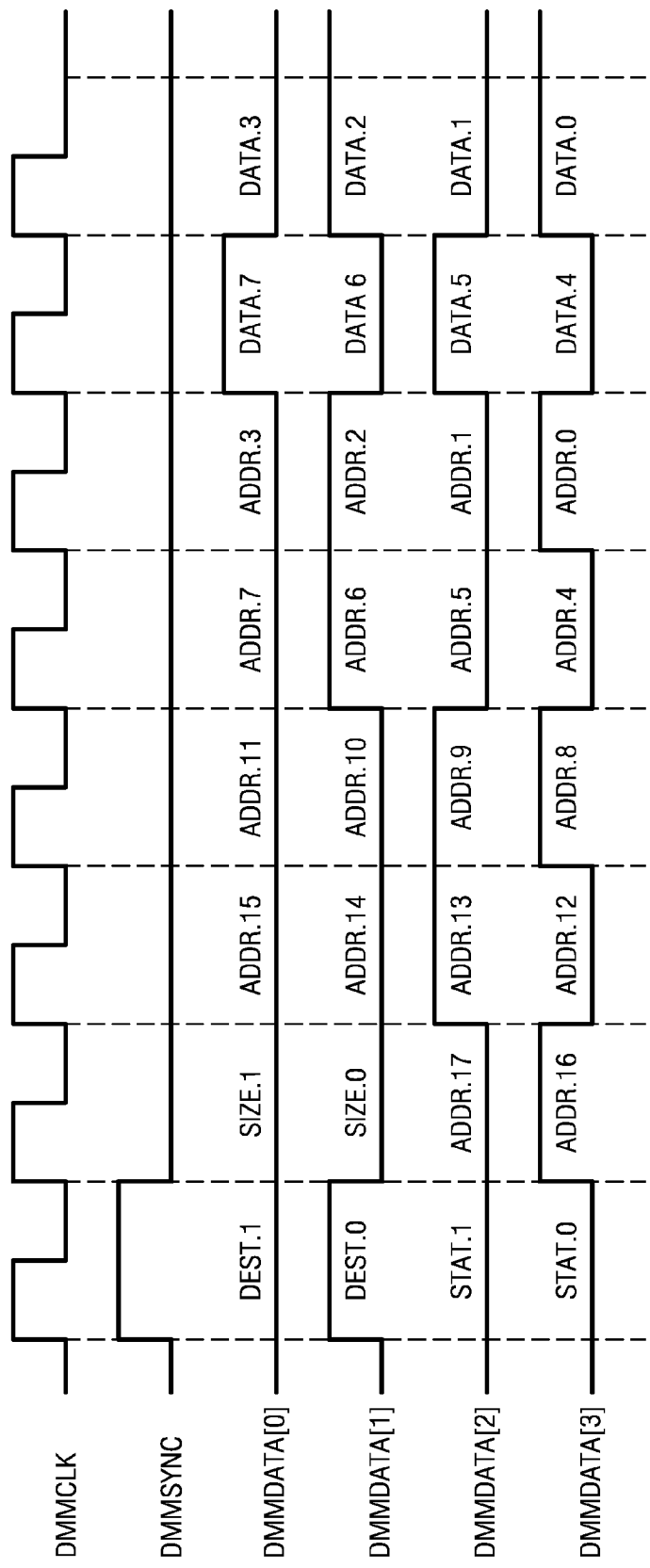
FIG. 5 illustrates waveforms relating to partially serialized data transmission according to an aspect of this invention.

FIG. 5 illustrates a configuration using four pins. FIG. 5 shows waveforms for a configuration using four pins DMMDATA[0], DMMDATA[1], DMMDATA[2] and DMMDATA[3] for data transmission. At the beginning of data transmission, the DMMSYNC pin is high for only one clock cycle of the clock signal DMMCLK. In the trace mode, the information included in a packet is distributed systematically over the four pins as explained with respect to FIG. 3(a). The first bit of DEST[1:0] is transmitted over DMMDATA[0] as DEST.1 in FIG. 5. The second bit DEST.0 is transmitted via the next pin DMMDATA[1]. This procedure is continued until all bits are transmitted. In the trace mode, the length of the data packet is determined by the size information contained in SIZE[1:0]. If the number of bits received between two synchronization signals at input pin DMMSYNC is not equal to the predefined packet width, an error is indicated by a specific flag. In non-continuous clock mode where the clock is suspended if no data is transmitted, the error is indicated for both, too long and too short packets. In continuous clock mode the error is only indicated, if the received packet is too short. In direct data mode, an error is indicated if the number of received bits is not equal to the bit width programmed in an internal register.

Figure 6:
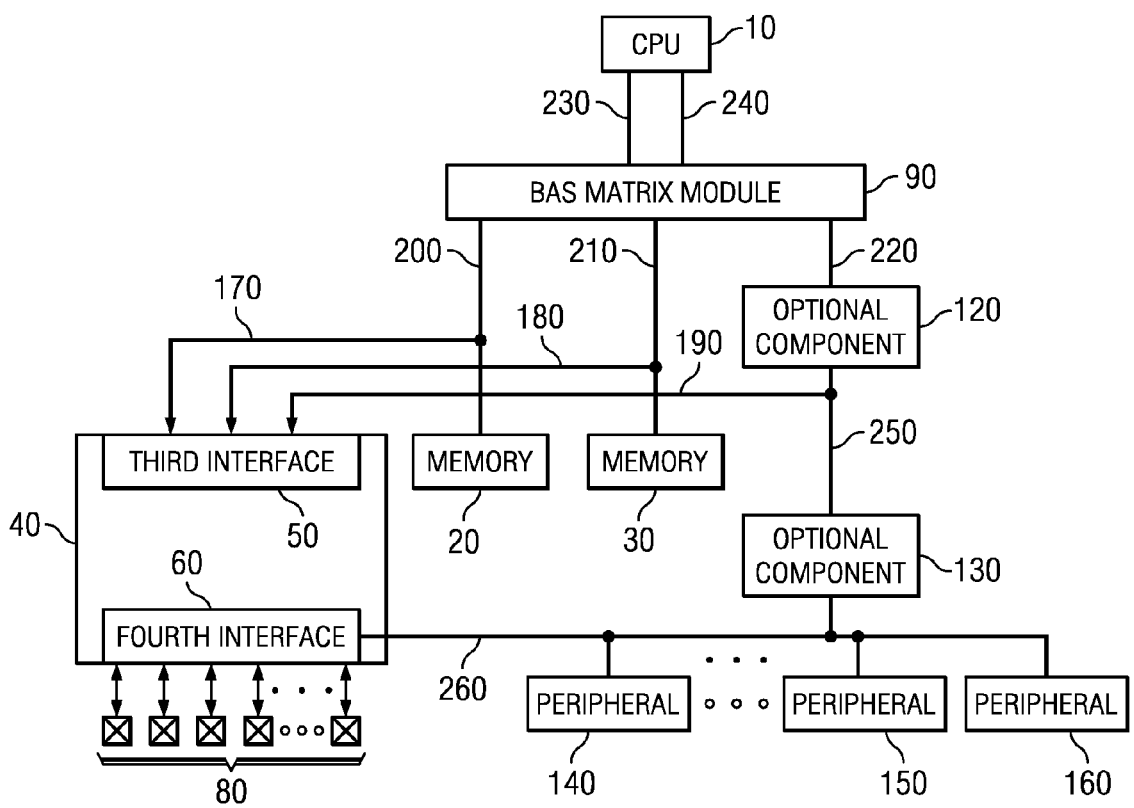
FIG. 6 illustrates a block diagram of a memory trace module according to an aspect of this invention.

FIG. 6 shows a simplified block diagram of an electronic device with a memory trace module 40. The electronic device may be the same or a different microcontroller than the one including the memory modification module 4 of this invention. The memory trace module is used with memory modification module 4 shown in FIGS. 1 and 2. A bus master such as central processing unit CPU 10, a first memory block 20 and a second memory block 30 are included in the integrated electronic device. Although only two memory blocks 20 and 30 are shown, the number of memory blocks is not limited. CPU 10 is coupled to memory blocks 20 and 30 via bus structures 230 and 240, and bus matrix module 90. Bus matrix module 90 performs any necessary converting or decoding steps in order to transfer data correctly between the memory blocks 20, 30 and CPU 10. Bus structures 170, 180 and 190 are coupled to respective bus portions 200, 210 and 250, thereby coupling the different bus portions to interfaces to peripheral devices 140, 150 and 160. The overall structure of the microcontroller shown in FIG. 6 corresponds to that shown in FIG. 1. Memory trace module 40 captures data and address information via the bus structures 170, 180 and 190 substantially as data and address information appears at the input and the output ports of the memory blocks 20 and 30. Memory blocks 20 and 30 are preferably random access memories (RAM) but other memory types may be used. Memory trace module 40 includes a first in first out (FIFO) buffer portion and third interface 50 for buffering the incoming data and the corresponding address information. Third interface 50 couples module 40 to bus portions 170, 180 and 190. Third internal interface 50 is further coupled to a FIFO or buffer where incoming data is stored. Fourth external interface 60 includes a group of pins 80 coupled to an external device (not shown). Fourth interface 60 transmits the data and address information received via bus portions 170, 180 and 190 and third interface and FIFO 50 to an external device using a specific protocol. This protocol preferably corresponds to the protocol used by the data modification module according to the present invention. Therefore, the number of external pins 80 depends on the specific implementation and settings of the microcontroller and the data modification module according to the present invention. Two, four or eight pins might be advantageous. Further bus structures 220, 250 and 260 connect interfaces 140, 150 and 160 to peripheral devices 140, 150 and 160 of the microcontroller to the bus matrix module 90. Blocks 120, 130 are optional components which perform signal or data conversion. Setting information propagating over bus portion 260 may be used to configure memory trace module 40. Memory trace module 40 can run in two different modes. The modes correspond to the direct data mode and the trace mode of the data modification module 4. Any internal settings of memory trace module 40 also correspond to settings in the data modification module. If memory modification module 4 and memory trace module 40 are implemented in different integrated electronic devices such as two different microcontrollers, the two modules can preferably be used for effective inter-processor communication between the two electronic devices. The modules use similar protocols having at least two modes; a direct data mode, where the data packets do not contain address information; and a trace mode with data packets include the address information. This forms a very effective communication channel between the two devices because no CPU resources are used in either electronic device.

What is claimed is:

1. A microcontroller comprising:
   a central processing unit (1);
   at least one memory (2, 3);
   a bus (20, 21, 23, 24) coupling the at least one memory (2, 3) to the central processing unit (1);
   a data modification module (4) for modifying data in the at least one memory (2, 3) including
      a first interface (5) coupled to the bus (20, 21, 23, 24) for transferring data to the at least one memory (2, 3) over the bus (20, 21, 23, 24), and
      a second interface (6, 8) operable to be coupled to an external device for receiving data from the external device in data packets;
   wherein the data modification module (4) operates as a bus master and transfers data received from the external device to the at least one memory (2, 3) thereby modifying data stored in the at least one memory; and
   wherein the data modification module (4) is operable in at least two modes including
      a trace mode wherein the data modification module (4) receives a destination address for the data in the data packets received from the external device, and
      a direct data mode wherein the data modification module (4) determines a destination address for the data using address information internal to the data modification module (4).

2. The microcontroller of claim 1, wherein:
   the data modification module (4) includes
      a first data buffer (OUTBUF) operable to cache the data at the first interface (5) before the data is transmitted to the at least one memory (2, 3) and
      a second data buffer (INBUF) operable to cache the data received via the second interface (8).

3. The microcontroller of claim 2, wherein:
   the data modification module (4) includes an interrupt generator generating an interrupt in response to a buffer full condition indicating that either the first data buffer (OUTBUF) or the second data buffer (INBUF) has reached a predefined fill level.

4. The microcontroller of claim 1, further comprising:
   a memory trace module (40) for tracing data of a write access to and/or a read access from the memory including
      a third interface (50) coupled to the bus (20, 21, 23, 24) for capturing the data and corresponding address information on the bus (20, 21, 23, 24),
      a fourth interface (60, 80) coupled to the external device, wherein the memory trace module (50) is operable to transfer the captured data and address information from the third interface (50) to the fourth interface (60, 80) and from the fourth interface (60, 80) to the external device.

5. The microcontroller of claim 4, wherein:
   the memory trace module (40) is further operable in at least two modes including
      a trace mode wherein the memory trace module (40) receives the destination address for the data in a data packets received from the external device, and
      a direct data mode wherein the memory trace module (40) determines the destination address for the data using address information internal to the memory trace module (40).

6. A microcontroller comprising:
   a central processing unit (1);
   at least one memory (2, 3);
   a bus (20, 21, 23, 24) coupling the at least one memory (2, 3) to the central processing unit (1);
   a data modification module (4) for modifying data in the at least one memory (2, 3) including
      a first interface (5) coupled to the bus (20, 21, 23, 24) for transferring data to the at least one memory (2, 3) over the bus (20, 21, 23, 24), and
      a second interface (6, 8) operable to be coupled to an external device for receiving the data;
   wherein the data modification module (4) operates as a bus master and transfers data received from the external device to the at least one memory (2, 3) thereby modifying data stored in the at least one memory; and
   the data modification module (4) is further coupled to a peripheral bus (25, 26) connecting the central processing unit (1) to an interface for a peripheral device (14, 15, 16) and further operable to transmit data to the bus (20, 21, 23, 24) between the central processing unit (1) and the peripheral device to transfer the received data to the at least one memory (2, 3).

7. A microcontroller comprising:
   a central processing unit (1);
   at least one memory (2, 3);
   a bus (20, 21, 23, 24) coupling the at least one memory (2, 3) to the central processing unit (1);
   a data modification module (4) for modifying data in the at least one memory (2, 3) including
      a first interface (5) coupled to the bus (20, 21, 23, 24) for transferring data to the at least one memory (2, 3) over the bus (20, 21, 23, 24), and
      a second interface (6, 8) operable to be coupled to an external device for receiving the data;
   wherein the data modification module (4) operates as a bus master and transfers data received from the external device to the at least one memory (2, 3) thereby modifying data stored in the at least one memory; and
   the data modification module (4) includes a memory protection mechanism to avoid overwriting of data stored at predetermined areas in the at least one memory (2, 3).

8. A system comprising:
   a first electronic device including
      a first central processing unit (1),
      at least one first memory (2, 3),
      a first bus (20, 21, 23, 24) coupling the at least one first memory (2, 3) to the first central processing unit (1),
      a data modification module (4) for modifying data in the at least one first memory (2,3) having
         a first interface (5) coupled to the first bus (20, 21, 23, 24) for transferring data to the at least one first memory (2, 3) over the first bus (20, 21, 23, 24),
         a second interface (6, 8) operable to be coupled to an external device for receiving the data, wherein the data modification module (4) is operable as a bus master to transfer data received from the external device to the at least one first memory (2, 3) thereby modifying data stored in the at least one first memory; and a second electronic device including a second central processing unit (10), at least one second memory (20, 30), a second bus (200, 210, 250) coupling the at least one second memory (20, 30) to the second central processing unit (10), a memory trace module (40) tracing data of a write access to and/or a read access from the at least one second memory (20, 30) having a third interface (50) coupled to the second bus (200, 210, 250) for capturing the data and a corresponding address information on the second bus (200, 210, 250), a fourth interface (60, 80) operable to be coupled to the external device, wherein the memory trace module (40) is operable to transfer the captured data and address information from the third interface (50) to the fourth interface (60, 80) and from the fourth interface (60, 80) to the external device.

9. The system according to claim 8, wherein;

the data modification module (4) and the memory trace module (40) are operable in a specific protocol including at least two modes a trace mode wherein the memory trace module (40) transfers the captured data and address information from the third interface (50) to the fourth interface (60, 80) and from the fourth interface (60, 80) to the external device and the data modification module (4) receives the destination address for the data in a data packet received from an external device, and a direct data mode wherein the data modification module (4) determines the destination address for the data using address information internal to the data modification module (4) and the memory trace module (40) retrieves data to be captured directly from a dedicated capture register and transfer the data to the external device.

* * * * *